US010812277B2

(12) United States Patent
Lu

(10) Patent No.: US 10,812,277 B2
(45) Date of Patent: Oct. 20, 2020

(54) METHOD AND SYSTEM FOR SECURE KEY EXCHANGE USING PHYSICALLY UNCLONABLE FUNCTION (PUF)-BASED KEYS

(71) Applicant: TAIWAN SEMICONDUCTOR MANUFACTURING COMPANY LTD., Hsinchu (TW)

(72) Inventor: Shih-Lien Linus Lu, Hsinchu (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 241 days.

(21) Appl. No.: 15/862,467

(22) Filed: Jan. 4, 2018

(65) Prior Publication Data
US 2019/0165954 A1 May 30, 2019

Related U.S. Application Data

(60) Provisional application No. 62/591,489, filed on Nov. 28, 2017.

(51) Int. Cl.
H04L 29/06 (2006.01)
H04L 9/32 (2006.01)
H04L 9/08 (2006.01)

(52) U.S. Cl.
CPC .......... H04L 9/3278 (2013.01); H04L 9/0825 (2013.01); H04L 9/0841 (2013.01); H04L 9/0861 (2013.01); H04L 9/0866 (2013.01); H04L 63/0428 (2013.01); H04L 63/0457 (2013.01)

(58) Field of Classification Search
CPC ... H04L 9/3278; H04L 9/0825; H04L 9/0861; H04L 63/0428
See application file for complete search history.

(56) References Cited

U.S. PATENT DOCUMENTS

| 9,279,850 | B1* | 3/2016 | Pedersen | H03K 19/003 |
| 2006/0209584 | A1* | 9/2006 | Devadas | G06F 21/31 365/52 |
| 2009/0282259 | A1* | 11/2009 | Skoric | G06F 21/35 713/185 |
| 2011/0215829 | A1* | 9/2011 | Guajardo Merchan | G06F 7/588 326/8 |
| 2012/0204023 | A1* | 8/2012 | Kuipers | G06F 21/10 713/150 |
| 2013/0142329 | A1* | 6/2013 | Bell | H04L 9/0866 380/44 |
| 2014/0258736 | A1* | 9/2014 | Merchan | G06F 21/62 713/193 |
| 2017/0141929 | A1* | 5/2017 | Afghah | H04L 9/3278 |

(Continued)

Primary Examiner — Sher A Khan
(74) Attorney, Agent, or Firm — WPAT, P.C., Intellectual Property Attorneys; Anthony King

(57) ABSTRACT

A method includes retrieving a registered response obtained in a registration process, the registered response being a physically unclonable function (PUF)-based response associated with a device; retrieving a registered helper data obtained in the registration process, the registered helper data corresponding to the registered response; generating a cipher text by encrypting a message with the registered response; and sending to the device over a public channel the cipher text with the registered helper data.

17 Claims, 18 Drawing Sheets

(56) References Cited

U.S. PATENT DOCUMENTS

2018/0129801 A1* 5/2018 Cambou ................ G06F 21/44
2019/0138753 A1* 5/2019 Wallrabenstein ........ G09C 1/00

* cited by examiner

METHOD AND SYSTEM FOR SECURE KEY
EXCHANGE USING PHYSICALLY
UNCLONABLE FUNCTION (PUF)-BASED
KEYS

CROSS-REFERENCE TO RELATED APPLICATION

This application claims the benefit of U.S. Provisional Application No. 62/591,489, filed Nov. 28, 2017.

BACKGROUND

A physically unclonable function (PUF) refers to a physical structure that is embodied in a physical device. Today, PUFs are usually implemented in integrated circuits and are typically used in applications with high security requirements. Although manufactured in high volume, each integrated circuit (IC) is unique due to the physical randomness even with the same manufacturing process and the same material. This inherent variation can be extracted and used as its unique identification, as DNA to human beings. Recently, security researchers have proposed a physical "function" called "Physically Unclonable Function" (PUF). A PUF in cryptography is a physical object which is easy to evaluate and produce an output but the output is very hard to predict.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
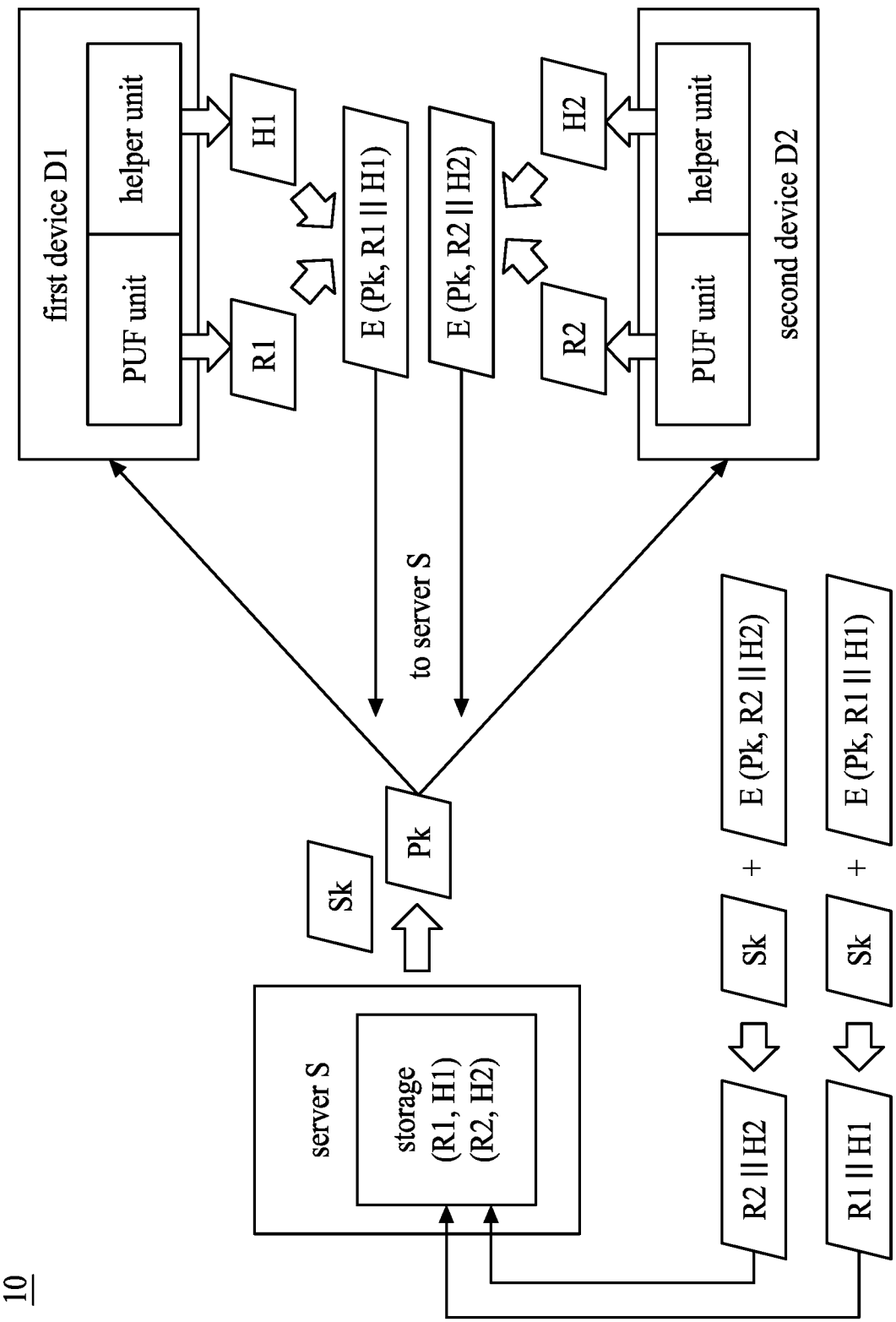
FIG. 1 is a systematic diagram of a system for key exchange during a registration process, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides a method and a system to exchange a private/secret key and helper data, generated using a PUF, between a server and a device over a public channel allowing secure communication using the secret key generated with PUF.

FIG. 1 is a systematic diagram of a system 10 for key exchange during a registration process, in accordance with some embodiments.

Referring to FIG. 1, the system 10 includes a server S and multiple devices. For brevity, only two exemplary devices, first device D1 and second device D2, of the multiple devices are illustrated. In an embodiment, the server S includes a computing device, while the first device D1 and the second device D2 may each include an "internet of things" (IoT) device. The system 10 is configured to exchange a secret or private key generated using a PUF between the server S and the devices D1 and D2 over a public channel allowing secure communication using the secret key generated with PUF.

Each of the first device D1 and the second device D2 includes a PUF unit for generating a response, and a helper unit for generating a helper data. In an embodiment, the helper unit generates a helper data in response to an output from the PUF unit. Since PUF bits may have noise, helper data is used to remove noise from the PUF response. A PUF response can be used as a unique identification or key in secure computing and communication for its following properties:

Uniqueness (individualism): each PUF is distinctive and different from other all other PUFs on the same chip or on other chips;

Inherent (born with): each PUF generates its unique output based on intrinsic properties of the PUF;

Unclonable (cannot be mimicked or duplicated): it is impossible to make an exact replica even when the exact manufacturing process is used; and Repeatable (reliable): the output of a PUF should not be affected by the operation environment and age.

There are many applications of PUFs to secure communication and computing. A PUF is constructed based on different physical process variations during the manufacturing of an integrated circuit (IC). These static physical variations allow an IC to have a unique fingerprint (or multiple unique fingerprints) to the particular IC. When a PUF unit on an IC generates a single fingerprint, this type of PUF is called a regular PUF or weak PUF. In contrast, when a PUF on an IC can generate multiple fingerprints, this type of PUF is called a strong PUF. A strong PUF has multiple "challenge" and "response" pairs. When a particular "challenge" is presented to the PUF a corresponding unique "response" is generated. A regular PUF (not a strong PUF) has only one response. When it is asked, it generate the "response" that is built-in to the IC.

When an IC is used as an IoT device, the IC is required to register with a server. In the system 10, the server S and the first device D1 or the second device D2 are required to complete a registration process before the server S and a particular device can communicate with each other. The registration process involves an exchange of a PUF response and a helper data corresponding to that response. An exchange protocol for a single PUF generated key in the system 10 is described below.

Server S generates a pair of keys, a public key Pk and a secret key Sk.

Server S sends the public key Pk to the first device D1 and the second device D2 and keeps the secret key Sk.

First device D1, in response to the public key received, activates a PUF on it and generates a first response R1 and a first helper data H1 corresponding to the first response R1. The first device D1 needs not to memorize the first helper data H1 (H1 needs not to be persistent). In the present embodiment, the on-chip PUF unit of the first device D1 includes a weak regular PUF and has only one response, the first response R1, when asked.

Similarly, the second device D2, in response to the public key received, activates a PUF on it and generates a second response R2 and a second helper data H2 corresponding to the second response R2. The second device D2 needs not to memorize the second helper data H2. In the present embodiment, the on-chip PUF unit of the second device D2 includes a weak regular PUF and has only one response, the second response R2, when asked.

An example of the helper data H1 and H2 is error correction code (ECC) check bits. As previously discussed, helper data is used to correct "noisy" bits in a PUF-based key. A noisy bit is a bit which may be different from one evaluation to another evaluation of a PUF. Since there may be bits that are different at which evaluation of PUF, a key generated with PUF directly may not be used without helper data. Because if a bit of the key is changed and the bit is unknown then a cipher text cannot be easily decrypted. For example, if there are 256 bits in a key and 3 of them may be unstable, then one must try all possible key's combinations (which is equal to C(256, 3)+C(256, 2)+C(256, 1)+C(256, 0). This is equal to 2763520+32640+256+1=2796417 possible keys. Even though this is feasible but it will take a long time and very ineffective.

First device D1 then uses the public key Pk received to encrypt the first response R1 and obtains a first cipher text E(Pk, R1||H1), in which the first response R1 and the first helper data H1 are concatenated, denoted as R1||H1 ("||" represents concatenation), before they are encrypted using the public key Pk. Subsequently, the first device D1 sends the first cipher text E(Pk, R1||H1) to the server S.

For notation purpose, a cipher text of a message M encrypted with a key K is denoted as E(K, M), while a cipher text decrypted with a key K is denoted as D(K, C). If both keys for decryption and encryption are the same we arrive at the original message M. That is, D(K, E(K, M))=M.

Similarly, the second device D2 uses the public key Pk received to encrypt the second response R2 and obtains a second cipher text E(Pk, R2||H2), in which the second response R2 and the second helper data H2 are concatenated, denoted as R2||H2, before they are encrypted using the public key Pk. Subsequently, the second device D2 sends the second cipher text E(Pk, R2||H2) to the server S.

Server S decrypts the received first cipher text E(Pk, R1||H1) using the secret key Sk paired with the public key Pk to obtain the message R1||H1. Server S then commits the first response R1 and the first helper data H1 into storage (persistent).

Also, server S decrypts the received second cipher text E(Pk, R2||H2) using the secret key Sk to obtain the message R2||H2. Server S then commits the second response R2 and the second helper data H2 into the storage (persistent).

The registration process will be repeated for other devices D3, D4 . . . DN. Anytime a new device is inserted into the group managed by the server S, the serve S will go through these steps to complete the registration. Since only the server S has the paired private key Sk corresponding to the public key Pk, it can decrypt the response and helper data and no other entity can do so. Others who intercepted the cipher text cannot make sense out of the response. After this exchange, both sides (the server S and the first device D1) have a common key, R1, and its helper data, H1. From now on the server S and this device D1 can communicate freely over a public channel using R1 and H1.

Figure 2A:
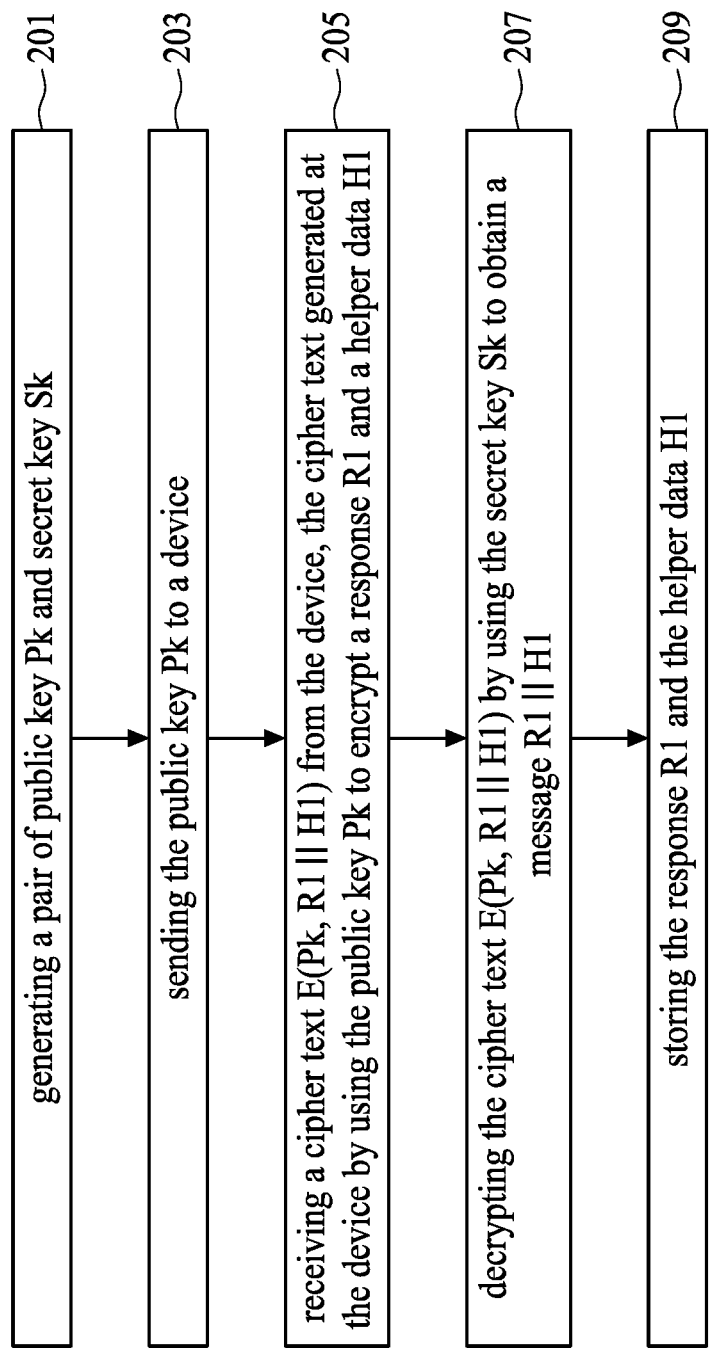
FIG. 2A is a flow diagram showing a method of key exchange for a server in the system illustrated in FIG. 1, in accordance with some embodiments.

FIG. 2A is a flow diagram showing a method of key exchange for a server in the system illustrated in FIG. 1, in accordance with some embodiments.

Referring to FIG. 2A, in operation 201, a pair of public key Pk and secret key Sk is generated. Then in operation 203, the public key Pk is sent to a device.

In operation 205, a cipher text E(Pk, R1||H1) is received from the device. The cipher text E(Pk, R1||H1) is generated at the device by using the public key Pk to encrypt a response R1 and a helper data H1 corresponding to the response R1.

In operation 207, the cipher text E(Pk, R1∥H1) is decrypted by using the secret key Sk to obtain a message R1∥H1, R1 concatenated with a corresponding helper data H1 (R1∥H1). The response R1 and the helper data H1 may then be de-concatenated by, for example, a reverse concatenation function.

Subsequently in operation 209, the response R1 and the helper data H1 are stored at the server. The response R1, a PUF-based key, will be used as a secret key for communication between the server and the device.

Figure 2B:
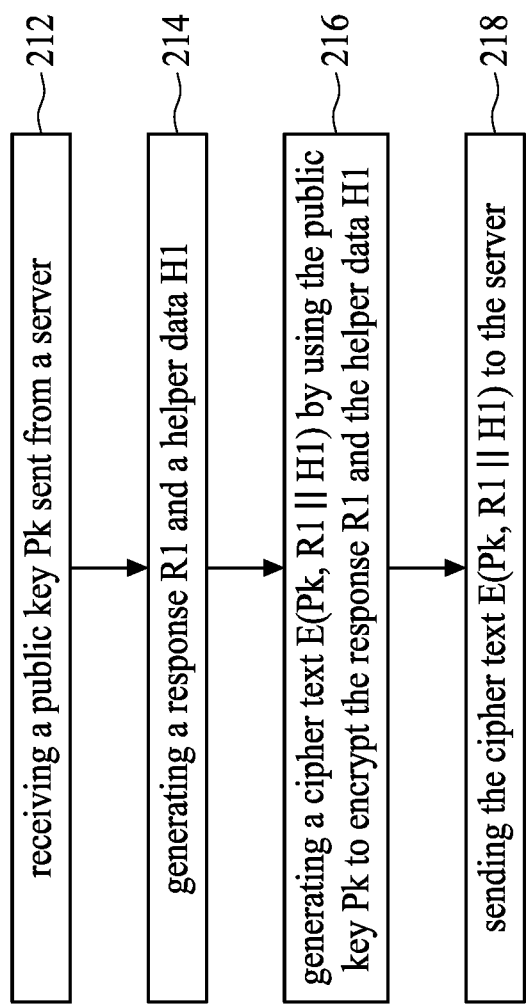
FIG. 2B is a flow diagram showing a method of key exchange for a device in the system illustrated in FIG. 1, in accordance with some embodiments.

FIG. 2B is a flow diagram showing a method of key exchange for a device in the system illustrated in FIG. 1, in accordance with some embodiments.

Referring to FIG. 2B, in operation 212, a public key Pk sent from a server is received. In response to the public key Pk received, in operation 214 a response R1 and a helper data H1 are generated.

Then in operation 216, a cipher text E(Pk, R1∥H1) is generated by using the public key Pk to encrypt the response R1 and the helper data H1.

Subsequently, the cipher text E(Pk, R1∥H1) is sent to the server in operation 218.

In some existing approaches, a possible way for a device to register with a server is through a private secure channel. Unlike the existing approaches, according to embodiments of the present disclosure, the registration process and subsequent secure message exchange between the device and the server employ a public channel instead of a private secure channel. During the registration, the two parties (server and device) involved agree on a PUF-based "secret" key for future secure communication.

In an embodiment, Diffie-Hellman key exchange protocol is used to exchange the PUF-based secret key during the registration and the message exchange between the device and the server without a private secure channel. The Diffie-Hellman key exchange protocol is a specific method of securely exchanging cryptographic keys over a public channel. Traditionally, secure encrypted communication between two parties required that they first exchange keys using a secure private physical channel, such as paper key lists transported by a trusted courier. The Diffie-Hellman key exchange method allows two parties that have no prior knowledge of each other to jointly establish a shared secret key over an insecure channel. This key can then be used to encrypt subsequent communications using a symmetric key cipher.

In another embodiment, Rivest-Shamir-Adleman (RSA) cryptosystem is used to exchange the PUF-based secret key during the registration and the message exchange between the device and the server. RSA cryptosystem is based on a mathematical one-way function allowing message to be encrypted with a public key that can only be decrypted with the corresponding private key.

Figure 3:
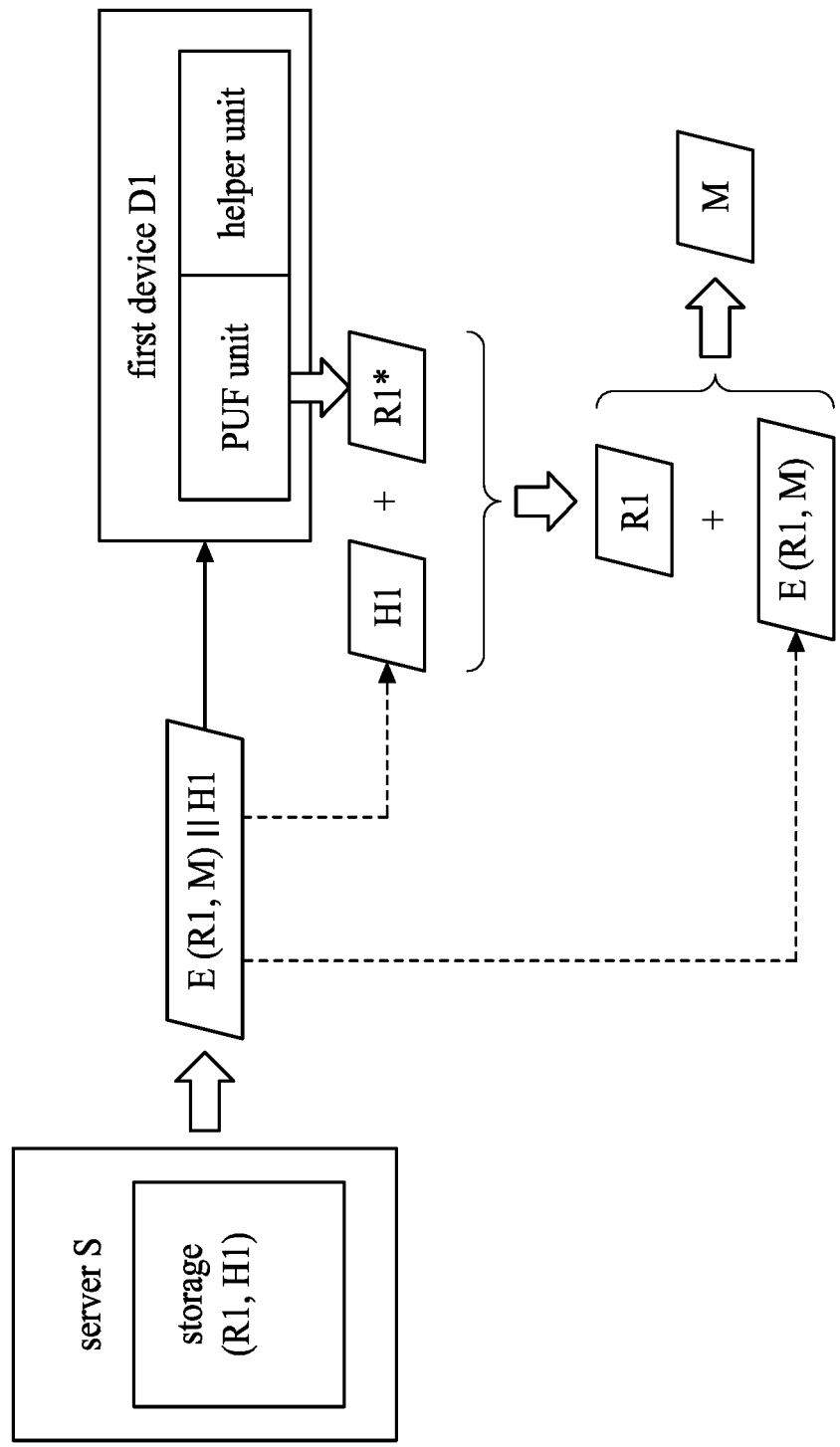
FIG. 3 is a schematic diagram of system for downlink transmission using physically unclonable function (PUF)-based keys, in accordance with some embodiments.

FIG. 3 is a schematic diagram of system 30 for downlink transmission using physically unclonable function (PUF)-based keys, in accordance with some embodiments.

Referring to FIG. 3, after a successful registration process, at the server side S the registered response R1 which serves as a PUF-based key and the registered helper data H1 are stored safely. At the device side D1 a response R1 can be generated when asked. Communicate between the server S and the device D1 in a downlink transmission is described below.

Server encrypts a message M with the registered response R1 to obtain a cipher text E(R1, M).

Server S sends to device D1 the cipher text with the registered helper data E(R1, M)∥H1. Device D1 receives E(R1, M)∥H1 and, in response to the cipher text and registered helper data received, generates a response from its PUF. The response may have more than one noisy bits and thus is called a noisy response R1*. The noisy response R1* is a noisy version of the registered response R1.

Device D1 then uses the registered helper data H1 received to reshape the noisy response R1* in order to obtain the registered response R1. Specifically, the registered helper data H1 received from the server S removes potential noise in the noise response R1*.

In an embodiment, the helper data generates a new helper data called H1* in repose to the noise response R1*. The received helper data H1 is then compared against the new helper data H1*. If they are identical, which means that the noise response R1* is identical with the registered response R1, then there is no need to reshape the noisy response R1*.

Subsequently, the device D1 uses the registered response R1 to decrypt the cipher text E(R1, M) and obtains the message M.

Figure 4A:
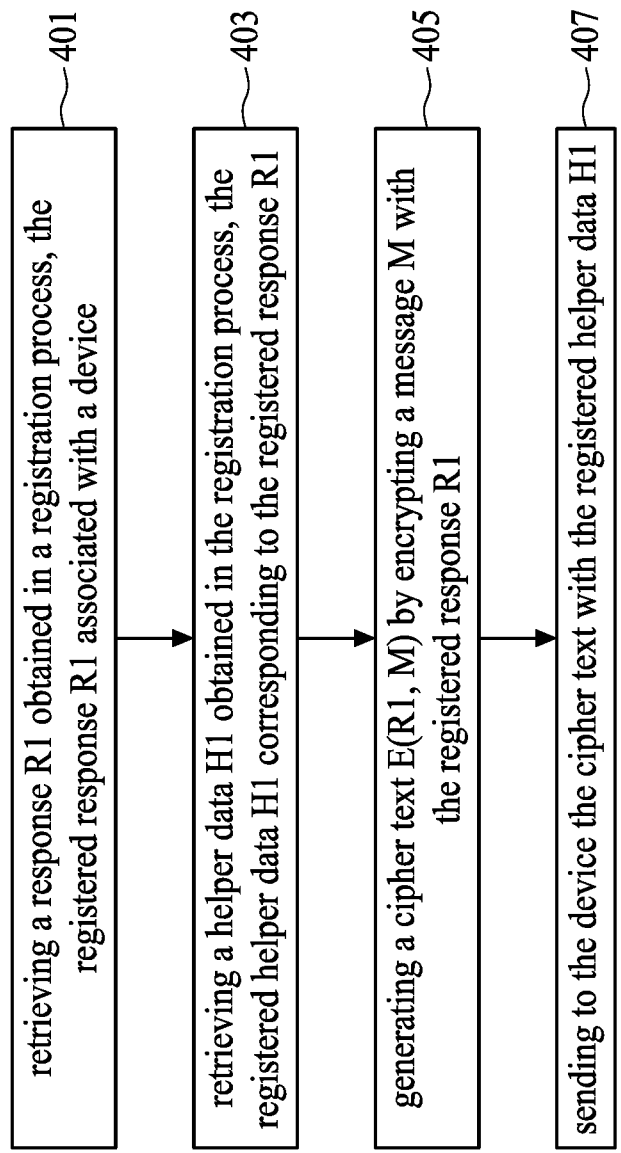
FIG. 4A is a flow diagram showing a method of downlink transmission for a server in the system illustrated in FIG. 3, in accordance with some embodiments.

FIG. 4A is a flow diagram showing a method of downlink transmission for a server in the system 30 illustrated in FIG. 3, in accordance with some embodiments.

Referring to FIG. 4A, in operation 401 a response R1 obtained in a registration process is retrieved from a storage of the server. The registered response R1 is associated with a device. In addition, in operation 403 a helper data H1 obtained in the registration process is retrieved from the storage. The registered helper data H1, corresponding to the registered response R1, helps to remove noisy bits, if any, in a noisy response R1*.

Then in operation 405 a cipher text E(R1, M) is generated by encrypting a message M with the registered response R1.

Subsequently, the cipher text E(R1, M) with the registered helper data H1, which may be concatenated into E(R1, M)∥H1, is sent to the device associated with the registered response R1 in operation 407.

Figure 4B:
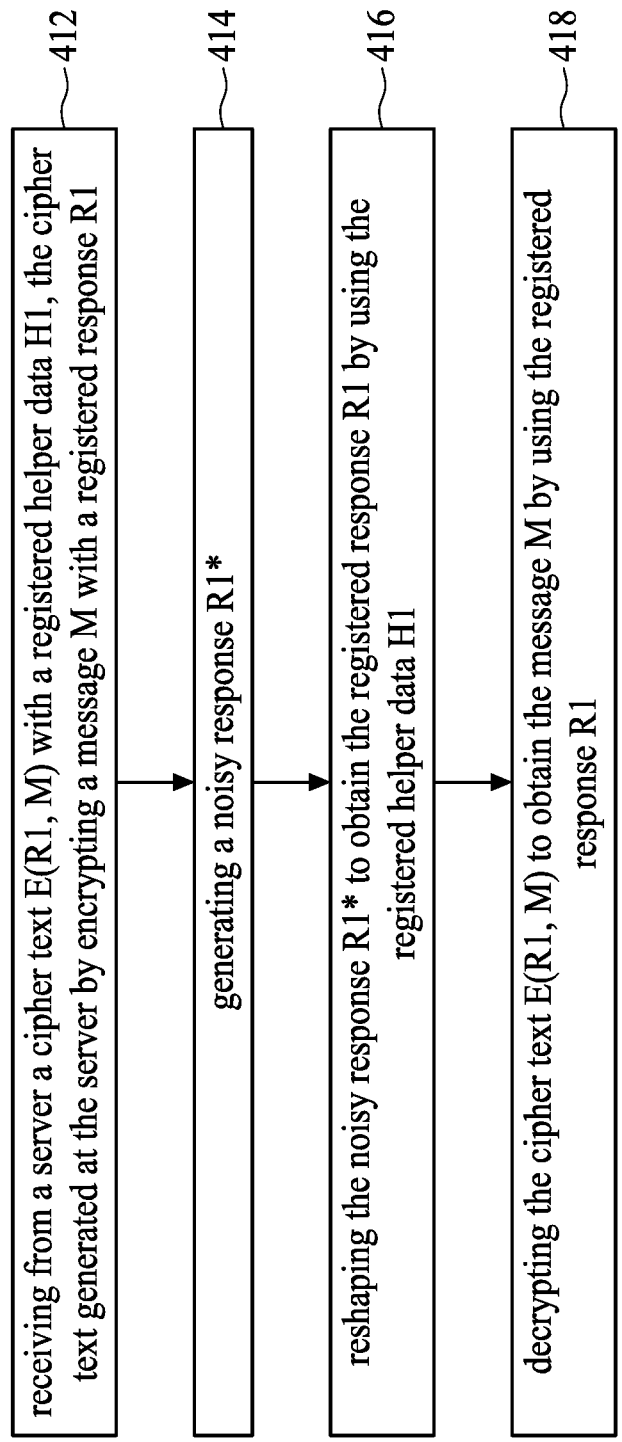
FIG. 4B is a flow diagram showing a method of downlink transmission for a device in the system illustrated in FIG. 3, in accordance with some embodiments.

FIG. 4B is a flow diagram showing a method of downlink transmission for a device in the system 30 illustrated in FIG. 3, in accordance with some embodiments.

Referring to FIG. 4B, in operation 412 a cipher text E(R1, M) with a registered helper data H1 is received from a server. The cipher text is generated at the server by encrypting a message M with a registered response R1.

In operation 414, in response to the cipher text E(R1, M) and registered helper data H1 received, a response is generated. The response may have one or more noisy bits and thus is a noisy response R1*.

Then in operation 416 the noisy response R1* is reshaped to obtain the registered response R1 by using the registered helper data H1 to remove noise in the noisy response R1*.

Subsequently, the cipher text E(R1, M) is decrypted to obtain the message M by using the registered response R1 in operation 418.

Figure 5:
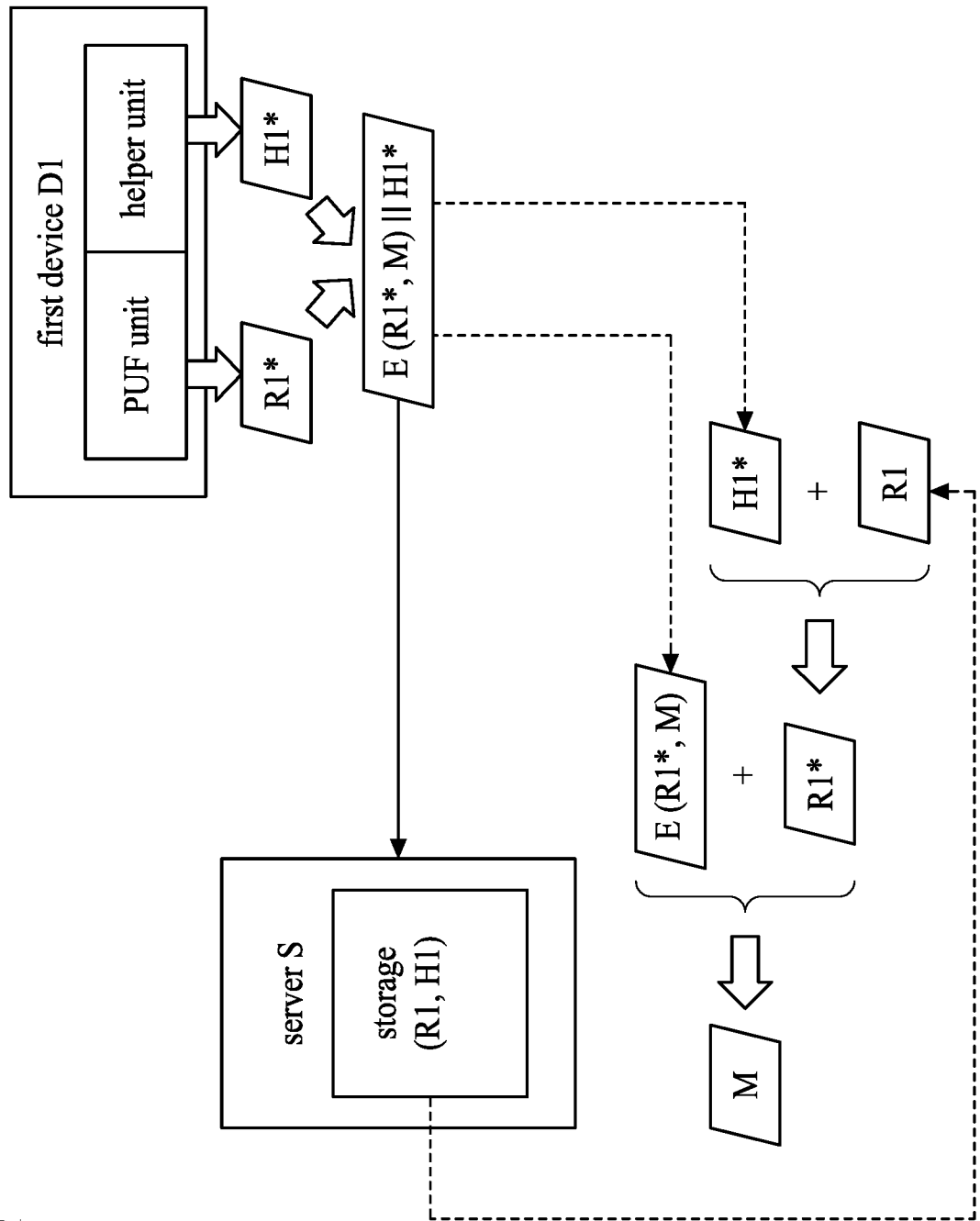
FIG. 5 is a schematic diagram of system for uplink transmission using PUF-based keys, in accordance with some embodiments.

FIG. 5 is a schematic diagram of system 50 for uplink transmission using PUF-based keys, in accordance with some embodiments.

Referring to FIG. 5, after a successful registration process, at the server side S the registered response R1 which serves as a PUF-based key and the registered helper data H1 are stored safely. At the device side D1 a response R1 can be generated when asked. Communicate between the server S and the device D1 in an uplink transmission is described below.

Device D1 generates a noisy response called R1* from its PUF. From the noisy response R1* the device D1 also generates a new helper data H1*.

Device D1 encrypts a message M using R1* to obtain a cipher text E(R1*, M). The cipher text E(R1*, M) may then be concatenated with the helper data H1* corresponding to the noisy response R1*, resulting in E(R1*, M)||H1*.

Device D1 sends the cipher text and the helper data in the form of E(R1*, M)||H1* to the server S.

Server S receives the cipher text E(R1*, M) and the helper data H1*, and uses the helper data H1* to derive the noise response R1* from the registered response R1. Subsequently, the server S uses the noisy response R1* to decrypt the cipher text E(R1*, M) to arrive at the message M. If the registered helper data H1 equals to the received helper data H1* then there is no need to modify R1. In that case R1=R1*. The server S then uses the registered R1 to decrypt the cipher text E(R1*, M) to arrive at the message M.

In an embodiment, the received helper data H1* is compared against the registered helper data H1. If they are identical, which means that the received noise response R1* is identical with the registered response R1, then there is no need to derive the noisy response R1* from the registered response R1.

Figure 6A:
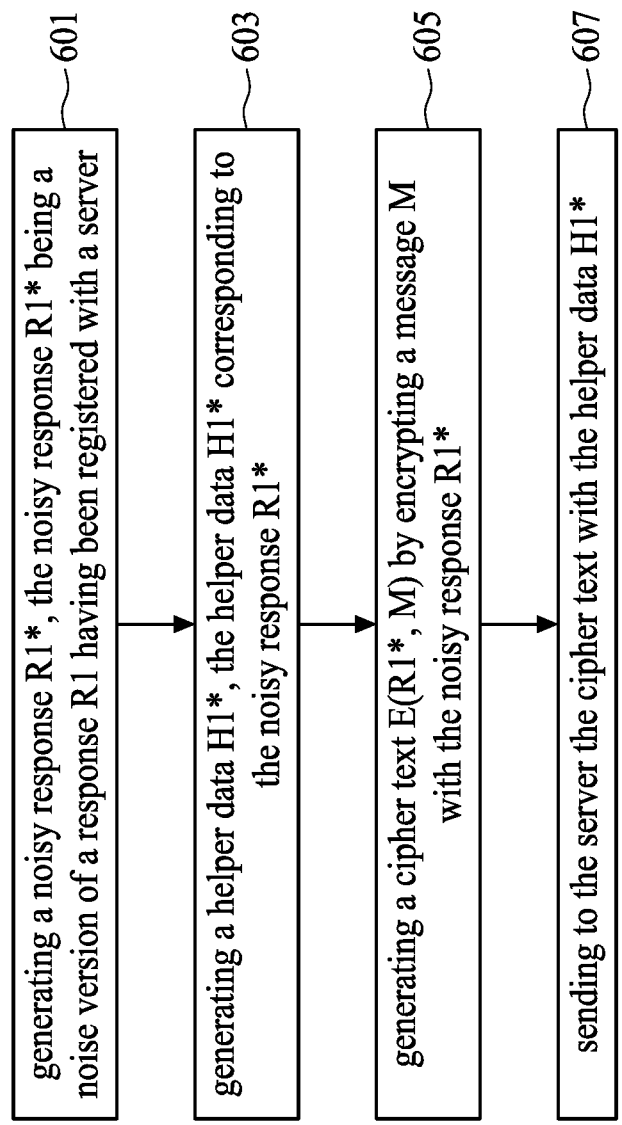
FIG. 6A is a flow diagram showing a method of uplink transmission for a device in the system illustrated in FIG. 5, in accordance with some embodiments.

FIG. 6A is a flow diagram showing a method of uplink transmission for a device in the system 50 illustrated in FIG. 5, in accordance with some embodiments.

Referring to FIG. 6A, in operation 601 a noisy response R1* is generated. The noisy response R1* is a noise version of a response R1 having been registered with a server.

In operation 603 a helper data H1* corresponding to the noisy response R1* is generated.

Then in operation 605 a cipher text E(R1*, M) is generated by encrypting a message M with the noisy response R1*.

Subsequently, the cipher text E(R1*, M) with the helper data H1*, which may be in the form of E(R1*, M)||H1*, is sent to the server.

Figure 6B:
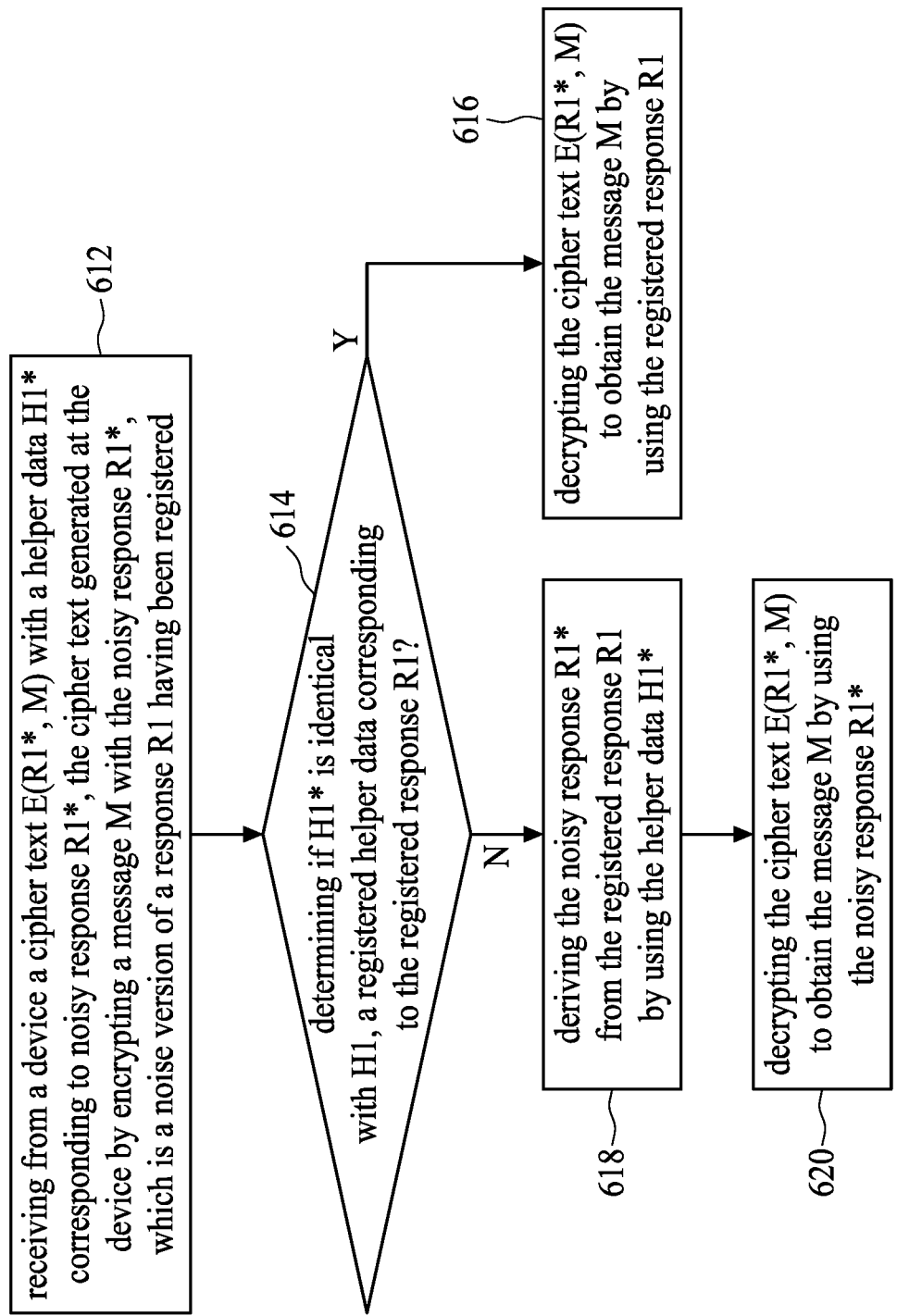
FIG. 6B is a flow diagram showing a method of uplink transmission for a server in the system illustrated in FIG. 5, in accordance with some embodiments.

FIG. 6B is a flow diagram showing a method of uplink transmission for a server in the system 50 illustrated in FIG. 5, in accordance with some embodiments.

Referring to FIG. 6B, in operation 612 a cipher text E(R1*, M) with a helper data H1* corresponding to noisy response R1* is received from a device. The cipher text E(R1*, M) is generated at the device by encrypting a message M with the noisy response R1*, which is a noise version of a response R1 having been registered.

In operation 614 it is determined if the helper data H1* corresponding to noisy response R1* is identical with a registered helper data H1 corresponding to the registered response R1. If affirmative, then in operation 616 the cipher text E(R1*, M) is decrypted to obtain the message M by using the registered response R1. If not, the noisy response R1* is derived from the registered response R1 by using the helper data H1* in operation 618. Subsequently, the cipher text E(R1*, M) is decrypted to obtain the message M by using the noisy response R1* in operation 620.

Figure 7:
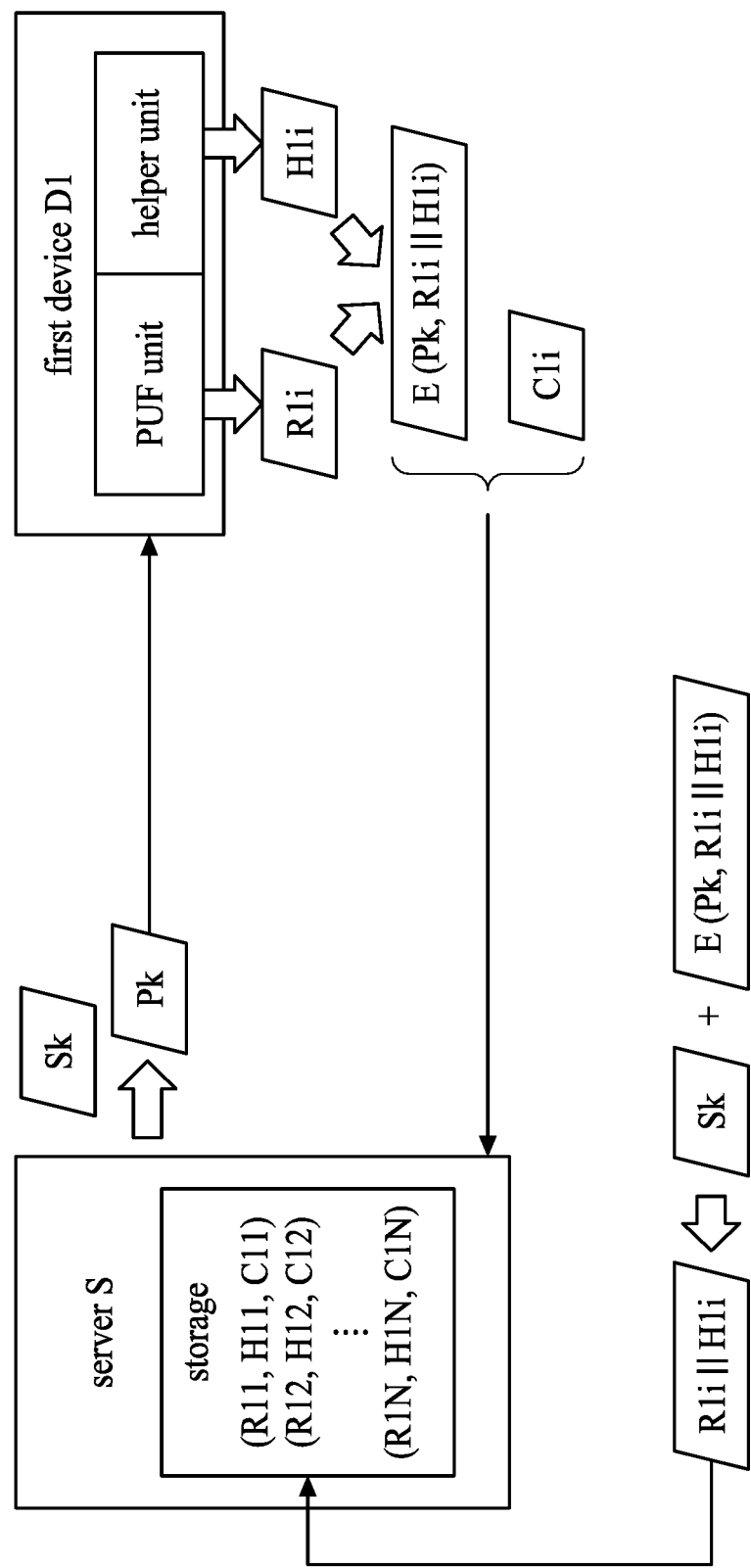
FIG. 7 is a systematic diagram of a system for key exchange during a registration process, in accordance with some embodiments.

FIG. 7 is a systematic diagram of a system 70 for key exchange during a registration process, in accordance with some embodiments.

Referring to FIG. 7, the system 70 is similar to the system 10 described and illustrated with reference to FIG. 1 except that, for example, the PUF unit of the device D1 is a strong PUF instead of a weak PUF. As previously discussed, a strong PUF has multiple "challenge" and "response" pairs. Each response has a given corresponding "challenge". A device with a strong PUF is more secure than a device with just a PUF in that a user can change a PUF-based "secret" key (R) throughout the life time of the device. That is, instead of a single response (used as the secret key), a user can change the key periodically, for example. In an embodiment, all challenge/response pairs may be exchanged at a registration process. In another example, a particular challenge/response pair may be exchanged through a registration process during the life time. An exchange protocol to exchange all challenge/response pairs at the initial registration time in the system 70 is described below.

Server S generates a pair of public key Pk and a secret key Sk.

Server S then sends the public key Pk to the device D1.

Device D1 activates the PUF on it and generates all responses (R1$i$) in response to challenges C1$i$, and generates all helper data H1$i$ each corresponding to a particular response R1$i$, "i" being a natural number from 1 to N. Again the device needs not to memorize any of the helper data H1$i$ (H1$i$ need not to be persistent).

Device D1 then uses the public key Pk received to encrypt all R1$i$ and obtain cipher texts E(Pk, R1$i$||H1$i$) and send the same together with the challenges C1$i$ to the server S.

Server S decrypts the received cipher texts using the secret key Sk paired with the public key Pk to obtain the messages R1$i$||H1$i$. Server S then commits all responses R1$i$, helper data H1$i$ and challenges C1$i$ into storage (persistent).

In other embodiments, the server S sends a challenge C1$i$ with the public key Pk at a time. Thus, at any given replace key time, a registration process similar to that described and illustrated with reference to FIG. 1 may be performed. Upon receiving the public key Pk and a particular challenge C1$i$, the device D1 will only give the corresponding R1$i$ and sends it back encrypted using the public key Pk. For the given period of time the communication will be done using that particular C1$i$ and R1$i$ pair. While in the case where all challenge and response pairs are exchanged initially, the server S can choose to use any one of the challenges to obtain a corresponding response at any time.

The registration process will be repeated for other devices D2, D3 . . . DN. Anytime a new device is inserted into the group managed by the server S, the serve S will go through these steps to complete the registration. Since only the server S has the paired private key Sk corresponding to the public key Pk, it can decrypt the response and helper data and no other entity can do so. Others who intercepted the cipher text cannot make sense out of the response. After this exchange, both sides (the server S and the device D1) have one or more PUF-based secret keys, R1$i$, and their respective helper data, H1$i$. From now on the server S and this device D1 can communicate freely over a public channel using R1$i$ and H1$i$.

Figure 8A:
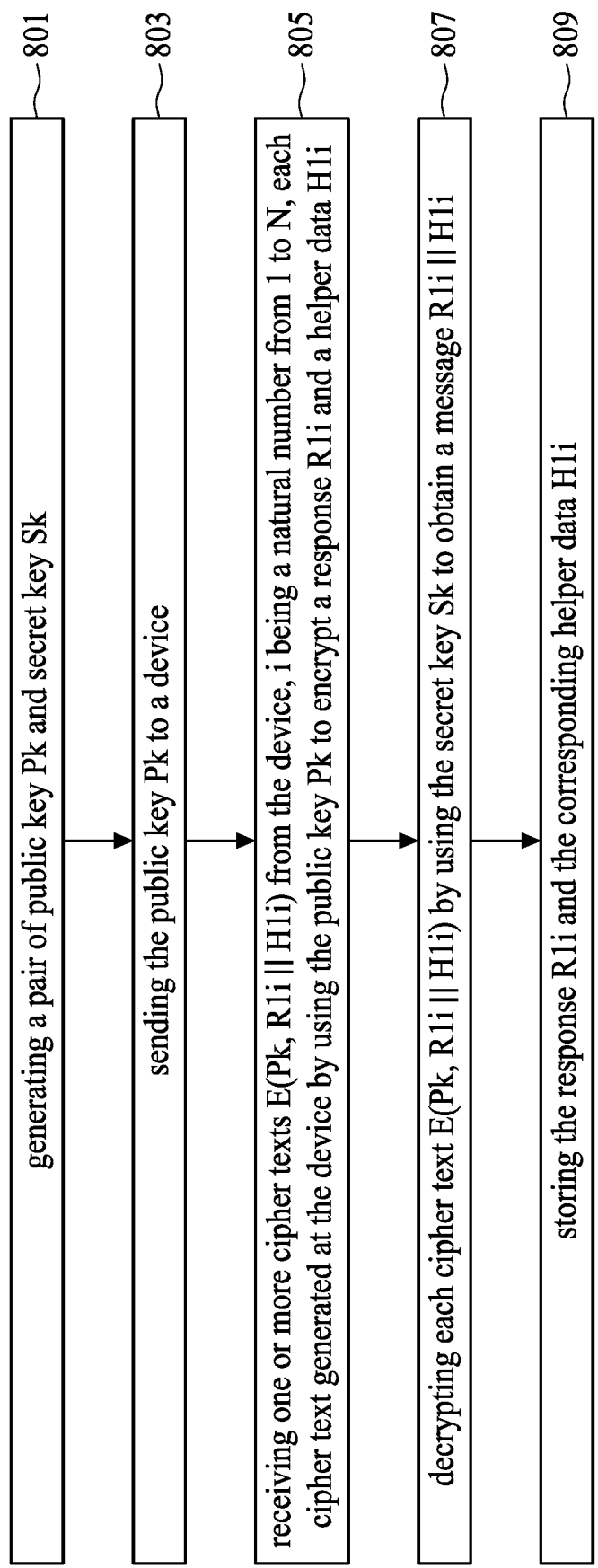
FIG. 8A is a flow diagram showing a method of key exchange for a server in the system illustrated in FIG. 7, in accordance with some embodiments.

FIG. 8A is a flow diagram showing a method of key exchange for a server in the system 70 illustrated in FIG. 7, in accordance with some embodiments.

Referring to FIG. 8A, in operation 801 a pair of public key Pk and secret key Sk is generated. The public key Pk is sent to a device in operation 803.

In operation 805 one or more cipher texts E(Pk, R1$i$||H1$i$) are received from the device. Each of the cipher texts E(Pk, R1$i$||H1$i$) is generated at the device by using the public key Pk to encrypt a response R1$i$ and a helper data H1$i$.

Then in operation 807 each of the cipher texts E(Pk, R1$i$||H1$i$) is decrypted by using the secret key Sk to obtain a message R1$i$||H1$i$.

Subsequently, the response R1$i$ and the corresponding helper data H1$i$ are stored in operation 809.

Figure 8B:
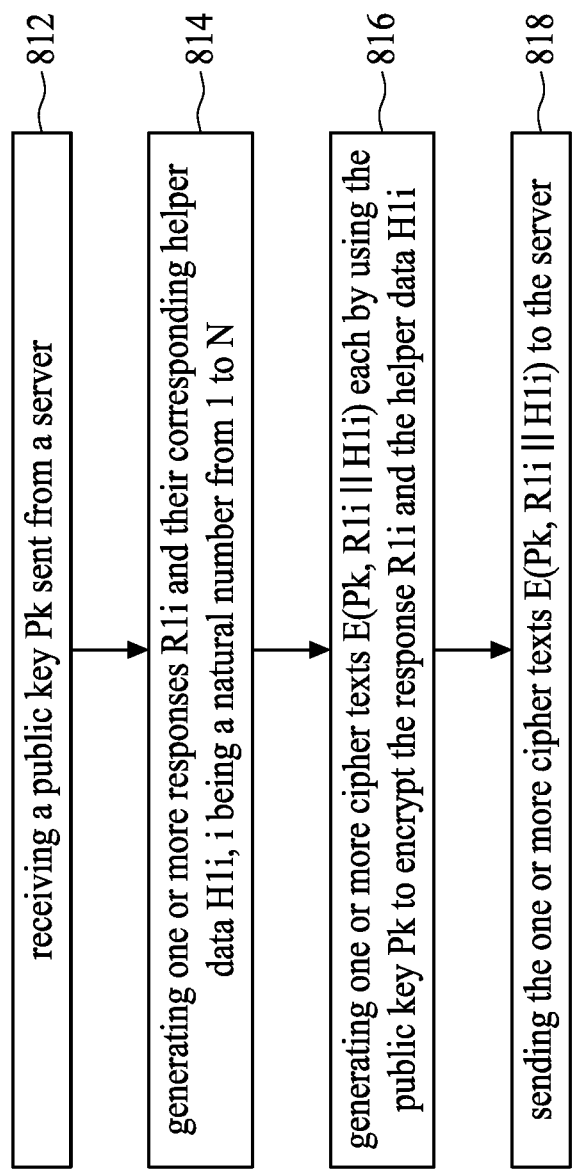
FIG. 8B is a flow diagram showing a method of key exchange for a device in the system illustrated in FIG. 7, in accordance with some embodiments.

FIG. 8B is a flow diagram showing a method of key exchange for a device in the system 70 illustrated in FIG. 7, in accordance with some embodiments.

Referring to FIG. 8B, in operation 812 a public key Pk sent from a server is received.

In operation 814 one or more responses R1$i$ and their corresponding helper data H1$i$ are generated.

Then in operation 816 one or more cipher texts E(Pk, R1$i$||H1$i$) are generated each by using the public key Pk to encrypt the one or more responses R1$i$ and the helper data H1$i$.

Subsequently, the one or more cipher texts E(Pk, R1$i$||H1$i$) are sent to the server in operation 818.

Figure 9:
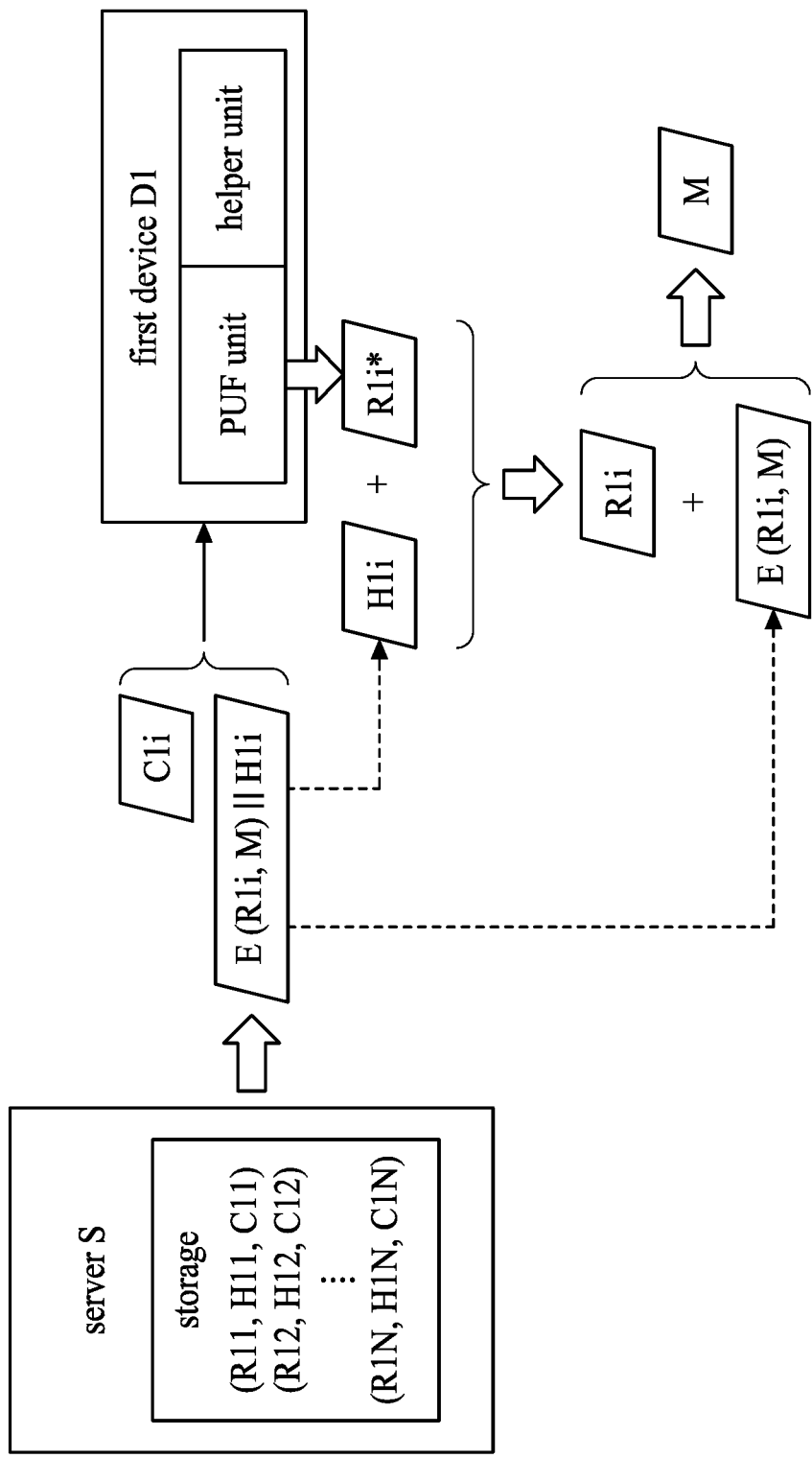
FIG. 9 is a schematic diagram of system for downlink transmission using PUF-based keys, in accordance with some embodiments.

FIG. 9 is a schematic diagram of system 90 for downlink transmission using PUF-based keys, in accordance with some embodiments.

Referring to FIG. 9, after a successful registration process, at the server side S the registered responses R1$i$ which serve as PUF-based keys and their corresponding registered helper data H1$i$ are stored safely. At the device side D1 one or more responses R1$i$ can be generated when asked. Communicate between the server S and the device D1 in a downlink transmission is described below.

Server S encrypts a message M with one of the registered responses R1$i$ to obtain a cipher text E(R1$i$, M).

Server S sends to the device D1 the cipher text with a registered helper data E(R1$i$, M)||H1$i$ and a challenge C1$i$ corresponding to the registered response R1$i$.

Device D1 receives the particular challenge C1$i$ and the cipher text E(R1$i$, M)||H1$i$, and generates a noisy response R1$i$* from its PUF using the received challenge C1$i$.

Device D1 uses the registered helper data H1$i$ received to reshape (remove noise) the noisy response R1$i$* in order to obtain the registered response R1$i$.

In an embodiment, the helper data generates a new helper data H1$i$* in repose to the noise response R1$i$*. The received helper data H1$i$ is then compared against the new helper data H1$i$*. If they are identical, which means that the noise response R1$i$* is identical with the registered response R1$i$, then there is no need to reshape the noisy response R1$i$*.

Device D1 uses the registered response R1$i$ to decrypt the cipher text E(R1$i$, M) to obtain the message M.

Figure 10A:
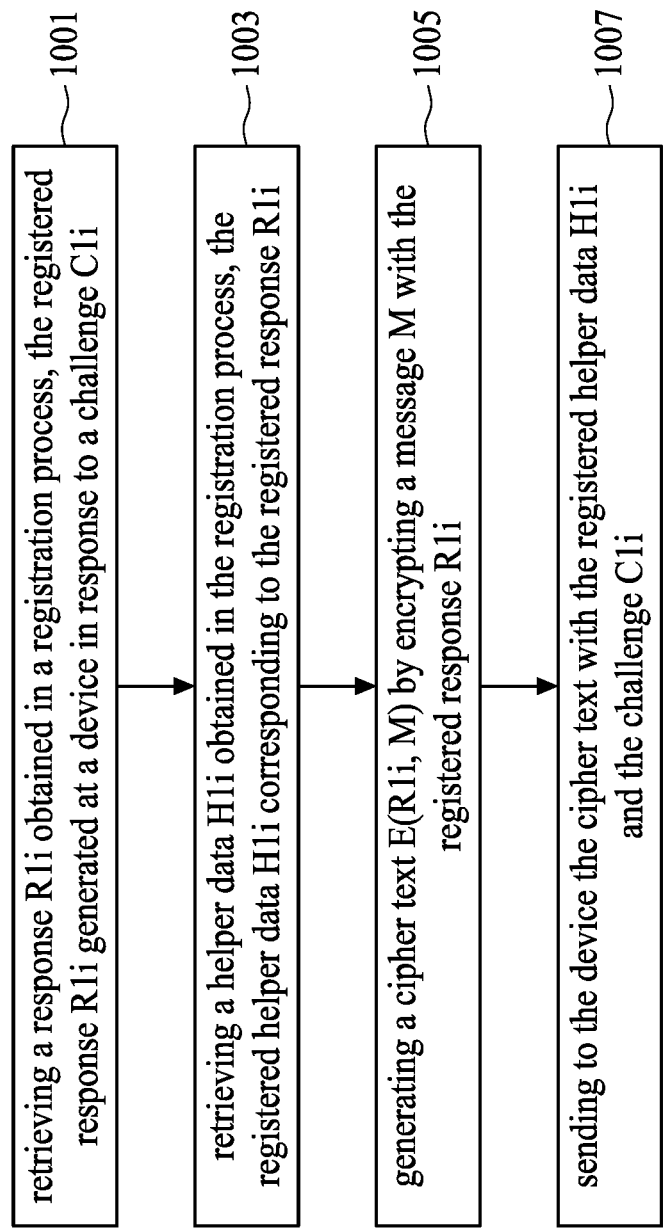
FIG. 10A is a flow diagram showing a method of downlink transmission for a server in the system illustrated in FIG. 9, in accordance with some embodiments.

FIG. 10A is a flow diagram showing a method of downlink transmission for a server in the system 90 illustrated in FIG. 9, in accordance with some embodiments.

Referring to FIG. 10A, in operation 1001 a response R1$i$ obtained in a registration process is retrieved. The registered response R1$i$ is generated at a device in response to a challenge C1$i$. In addition, in operation 1003 a helper data H1$i$ obtained in the registration process is retrieved. The registered helper data H1$i$ corresponds to the registered response R1$i$.

Then in operation 1005 a cipher text E(R1$i$, M) is generated by encrypting a message M with the registered response R1$i$.

Subsequently, the challenge C1$i$ and the cipher text E(R1$i$, M) with the registered helper data H1$i$ in the form of E(R1$i$, M)||H1$i$ are sent to the device in operation 1007.

Figure 10B:
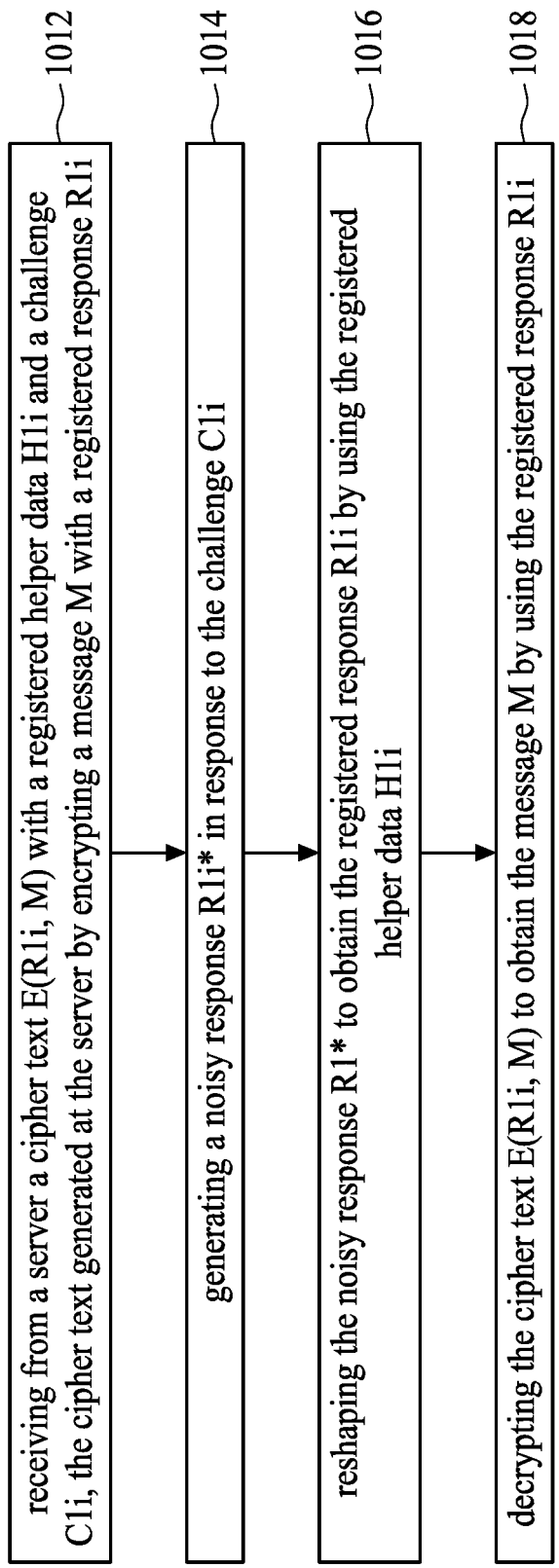
FIG. 10B is a flow diagram showing a method of downlink transmission for a device in the system illustrated in FIG. 9, in accordance with some embodiments.

FIG. 10B is a flow diagram showing a method of downlink transmission for a device in the system 90 illustrated in FIG. 9, in accordance with some embodiments.

Referring to FIG. 10A, in operation 1012 a challenge C1$i$ and a cipher text E(R1$i$, M) with a registered helper data H1$i$ are received from a server. The cipher text E(R1$i$, M) is generated at the server by encrypting a message M with a registered response R1$i$. Moreover, the registered response R1$i$, obtained through a registration process between the device and the server, is a response R1$i$ generated at the device in response to the challenge C1$i$.

In operation 1014 a response, since by nature is subject to noise and thus is called a noisy response R1$i$*, is generated in response to the challenge C1$i$.

Then in operation 1016 the noisy response R1* is reshaped by using the registered helper data H1$i$ to obtain the registered response R1$i$ by using the registered response R1$i$.

Subsequently, the cipher text E(R1$i$, M) is decrypted to obtain the message M by using the registered response R1$i$ in operation 1018.

Figure 11:
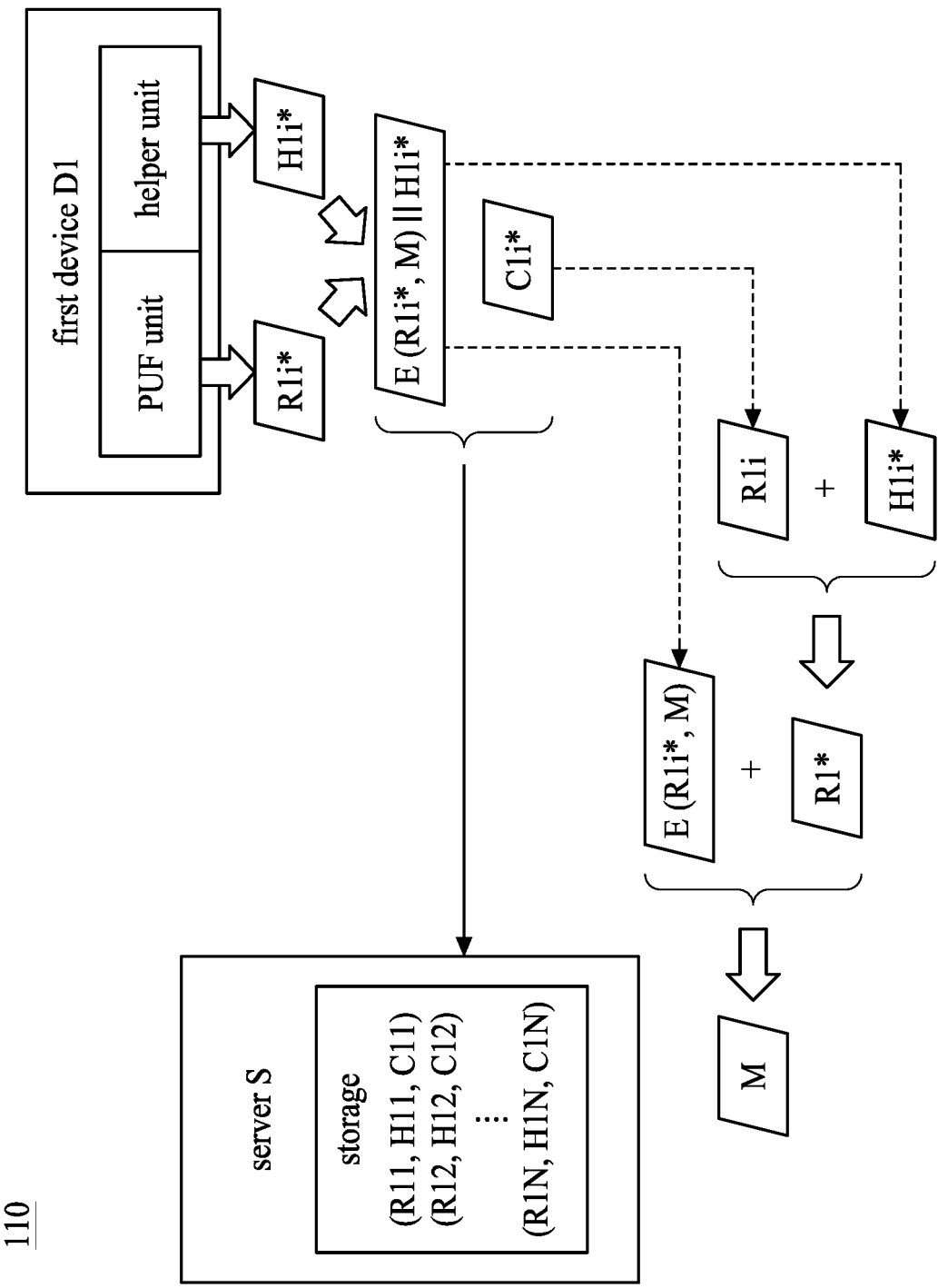
FIG. 11 is a schematic diagram of system for uplink transmission using PUF-based keys, in accordance with some embodiments.

FIG. 11 is a schematic diagram of system 110 for uplink transmission using PUF-based keys, in accordance with some embodiments.

Referring to FIG. 11, after a successful registration process, at the server side S the registered responses R1$i$ which serve as PUF-based keys and their corresponding registered helper data H1$i$ are stored safely. At the device side D1 a response R1$i$ can be generated when asked. Communicate between the server S and the device D1 in an uplink transmission is described below.

Device D1 generates a noisy response R1$i$* from its PUF using a random challenge C1$i$. From the noisy response R1$i$* the device D1 also generates a new helper data H1$i$*.

Device D1 encrypts a message M using the noisy response R1$i$* to obtain a cipher text E(R1$i$*, M).

Device D1 sends the challenge C1$i$ and the cipher text with the helper data, E(R1$i$*, M)||H1$i$*, to the server.

Server S receives the challenge C1$i$, the cipher text E(R1$i$*, M) and the helper data H1$i$*, and uses the received challenge C1$i$ to obtain a corresponding response R1$i$ that has been registered with the server S. Further, the server S uses the received helper data H1$i$* to derive the noisy response R1$i$* from the registered response R1$i$. Subsequently, the server S uses the noisy response R1$i$* to decrypt the cipher text E(R1$i$*, M) to arrive at the message M. If the registered helper data H1 equals to the received helper data H1* then there is no need to modify R1. In that case R1=R1*. The server S then uses the registered R1 to decrypt the cipher text E(R1*, M) to arrive at the message M.

In an embodiment, the received helper data H1$i$* is compared against the registered helper data H1$i$. If they are identical, which means that the received noise response R1$i$* is identical with the registered response R1$i$, then there is no need to derive the noisy response R1$i$* from the registered response R1$i$.

Figure 12A:
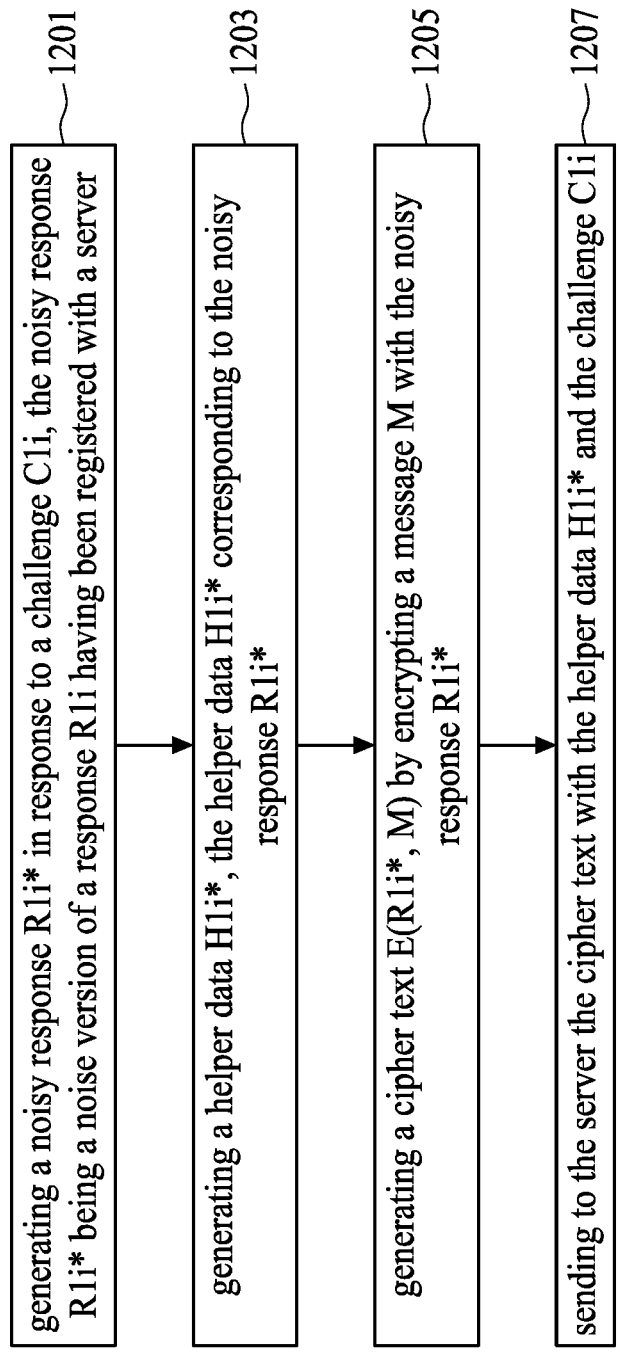
FIG. 12A is a flow diagram showing a method of uplink transmission for a device in the system illustrated in FIG. 11, in accordance with some embodiments.

FIG. 12A is a flow diagram showing a method of uplink transmission for a device in the system 110 illustrated in FIG. 11, in accordance with some embodiments.

Referring to FIG. 12A, in operation 1201 a noisy response R1$i$* is generated in response to a challenge C1$i$. The noisy response R1$i$* is a noise version of a response R1$i$ having been registered with a server.

In operation 1203 a helper data H1$i$* corresponding to the noisy response R1$i$* is generated.

Then in operation 1205 a cipher text E(R1$i$*, M) is generated by encrypting a message M with the noisy response R1$i$*.

Subsequently, the challenge C1$i$ and the cipher text E(R1$i$*, M) with the helper data H1$i$* are sent to the server in operation 1207.

Figure 12B:
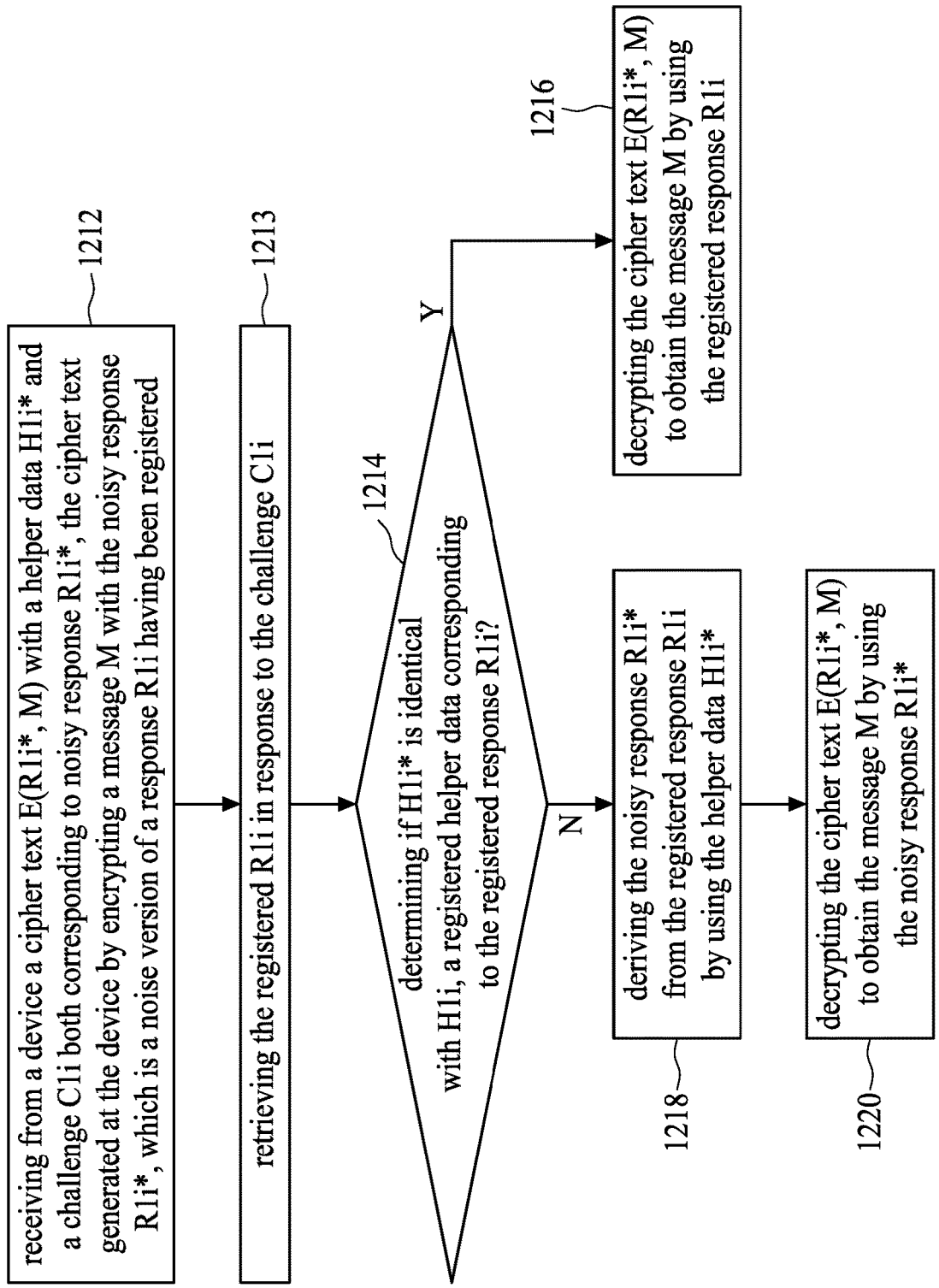
FIG. 12B is a flow diagram showing a method of uplink transmission for a server in the system illustrated in FIG. 11, in accordance with some embodiments.

FIG. 12B is a flow diagram showing a method of uplink transmission for a server in the system 110 illustrated in FIG. 11, in accordance with some embodiments.

Referring to FIG. 12B, in operation 1212 a cipher text E(R1$i$*, M) with a helper data H1$i$* and a challenge C1$i$ both corresponding to noisy response R1$i$* are received from a device. The cipher text E(R1$i$*, M) is generated at the device by encrypting a message M with the noisy response R1$i$*, which is a noise version of a response R1$i$ having been registered.

In operation 1213 the registered R1$i$ in response to the challenge C1$i$ is retrieved.

It is determined if the received helper data H1$i$* is identical with a registered helper data H1$i$ corresponding to the registered response R1$i$ in operation 1214. If affirmative, then in operation 1216 the cipher text E(R1$i$*, M) is decrypted to obtain the message M by using the registered response R1$i$. If not, in operation 1218 the noisy response R1$i$* is derived from the registered response R1$i$ by using the helper data H1$i$*. Subsequently, the cipher text E(R1$i$*, M) is decrypted to obtain the message M by using the noisy response R1$i$*.

In some embodiments, the present disclosure provides a method that includes retrieving a registered response obtained in a registration process, the registered response being a physically unclonable function (PUF)-based response associated with a device; retrieving a registered helper data obtained in the registration process, the registered helper data corresponding to the registered response; generating a cipher text by encrypting a message with the registered response; and sending to the device over a public channel the cipher text with the registered helper data.

In some embodiments, the present disclosure also provides a method that includes generating a noisy response, the noisy response being a noise version of a registered response having been registered with a server in a registration process; generating a helper data corresponding to the noisy response; generating a cipher text by encrypting a message with the noisy response; and sending to the server over a public channel the cipher text with the helper data.

In some embodiments, the present disclosure provides a system that includes a server. The server is configured to retrieve a registered response obtained in a registration process, the registered response being a physically unclonable function (PUF)-based response associated with a device; retrieve a registered helper data obtained in the registration process, the registered helper data corresponding to the registered response; generate a cipher text by encrypting a message with the registered response; and send to the device over a public channel the cipher text with the registered helper data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
retrieving a registered response obtained in a registration process, the registered response being a physically unclonable function (PUF)-based response associated with a device;
retrieving a registered helper data obtained in the registration process, the registered helper data corresponding to the registered response;
generating a cipher text by encrypting a message with the registered response;
sending to the device over a public channel the cipher text with the registered helper data;
receiving the cipher text with the registered helper data;
generating a noisy response;
reshaping the noisy response to obtain the registered response by using the registered helper data; and
decrypting the cipher text to obtain the message by using the registered response.

2. The method according to claim 1, wherein the registration process comprises:
generating a pair of public key and secret key;
sending the public key to the device; and
receiving a cipher text from the device, the received cipher text generated at the device by using the public key to encrypt a response and a helper data corresponding to the response.

3. The method according to claim 2 further comprising:
decrypting the received cipher text by using the secret key to obtain a message in the received cipher text; and
storing the response and the helper data.

4. The method according to claim 2 further comprising:
sending a challenge together with the public key to the device.

5. The method according to claim 1, wherein the registration process comprises:
receiving a public key sent from a server;
generating a response and a helper data in response to the public key;
generating a cipher text by using the public key to encrypt the response and the helper data; and
sending the generated cipher text to the server.

6. The method according to claim 5 further comprising:
concatenating the response and the helper data before encrypting the response and the helper data.

7. The method according to claim 1, wherein the PUF-based response includes a built-in response in the device.

8. The method according to claim 1, wherein the PUF-based response includes a response generated at the device in response to a challenge from a server.

9. A method, comprising:
generating a noisy response, the noisy response being a noise version of a registered response having been registered with a server in a registration process;
generating a helper data corresponding to the noisy response;
generating a cipher text by encrypting a message with the noisy response;
sending to the server over a public channel the cipher text with the helper data;
receiving the cipher text and the helper data;
deriving the noisy response from the registered response by using the helper data received; and
decrypting the cipher text to obtain the message by using the noisy response.

10. The method according to claim 9 further comprising:
receiving the cipher text and the helper data;
determining that the helper data received is identical with a registered helper data corresponding to the registered response; and
decrypting the cipher text to obtain the message by using the registered response.

11. The method according to claim 9 further comprising:
receiving a challenge together with a public key during the registration process.

12. The method according to claim 11, wherein the registered response includes a response generated in response to the received challenge.

13. A system, comprising:
a physical server configured to:
retrieve a registered response obtained in a registration process, the registered response being a physically unclonable function (PUF)-based response associated with an integrated circuit (IC) device;
retrieve a registered helper data obtained in the registration process, the registered helper data corresponding to the registered response;
generate a cipher text by encrypting a message with the registered response; and
send to the IC device over a public channel the cipher text with the registered helper data,
wherein the IC device is configured to:
receive the cipher text with the registered helper data;
generate a noisy response;
reshape the noisy response to obtain the registered response by using the registered helper data; and
decrypt the cipher text to obtain the message by using the registered response.

14. The system according to claim 13, wherein the physical server is further configured to, during the registration process:
generate a pair of public key and secret key;
send the public key to the IC device; and
receive a cipher text from the IC device, the received cipher text generated at the IC device by using the public key to encrypt a response and a helper data corresponding to the response.

15. The system according to claim 14, wherein the physical server is further configured to, during the registration process:
decrypt the received cipher text by using the secret key to obtain a message in the received cipher text; and
store the response and the helper data.

16. The system according to claim 14, wherein the physical server is further configured to, during the registration process:
send a challenge together with the public key to the IC device.

17. The system according to claim 13, wherein the IC device is configured to, during the registration process:
receive a public key sent from the physical server;
generate a response and a helper data in response to the public key received;
generate a cipher text by using the public key to encrypt the response and the helper data; and
send the generated cipher text to the physical server.

* * * * *